Patented Oct. 7, 1952

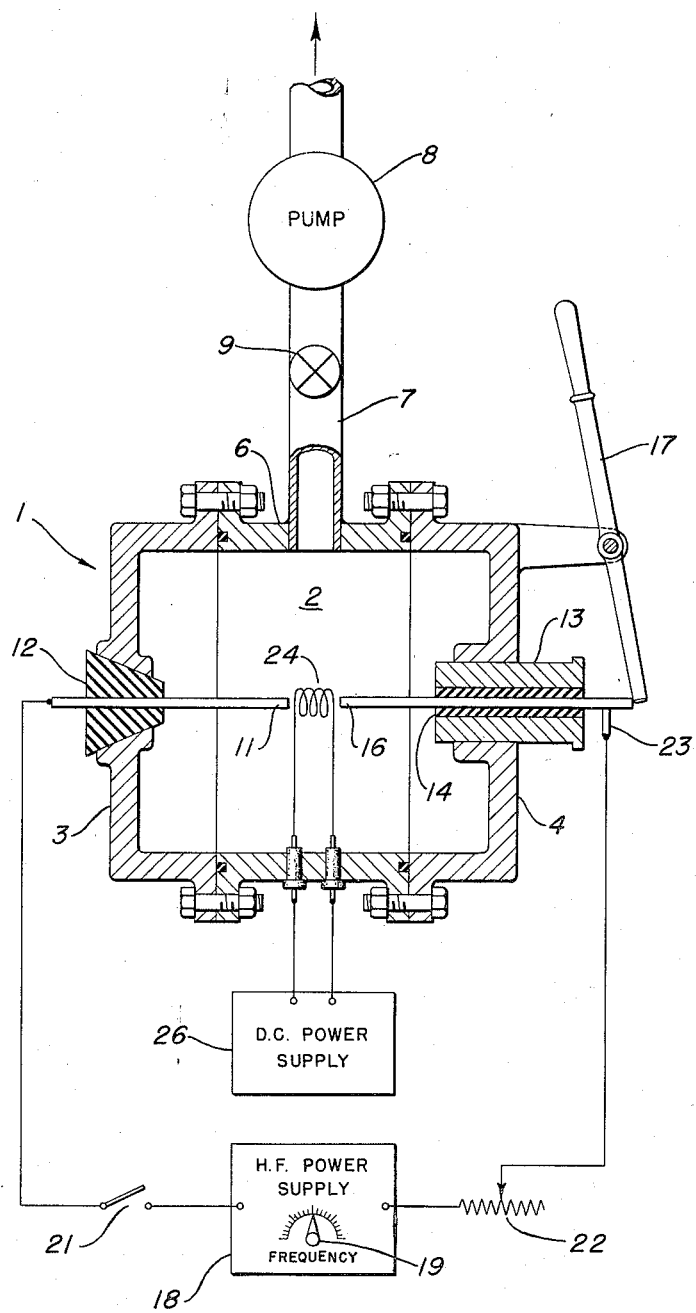

2,613,305

UNITED STATES PATENT OFFICE 2,613,305

WELDING DEVICE

Robert W. Clack, Lafayette, Calif., assignor to the United States of America as represented by the United States Atomic Energy Commission Application November 26, 1951, Serial No. 258,225

10 Claims. (Cl. 219—8)

The present invention relates to electric welding devices and to improvements thereof particularly with respect to butt welding.

Although the art of welding has been widely exploited and innumerable devices developed for electric welding, such devices commonly require an electric current of a very large order with a consequently high operating cost, as well as requiring large size equipment. Also conventional electric welding devices deposit a certain amount of metal oxide in the weld joint which tends to weaken the weld.

The present invention operates by electron discharge between parts to be welded, and provides for the maximum utilization of the energy applied by the use of all electrons forming a part of the discharge and preferably by multiplying the number of electrons by a resonant interchange of energy between adjacent surfaces to be joined. Provision is also made for the exclusion of extraneous matter, such as oxides, from the weld joint and for the automatic adjustment of the parts to be welded into proper position for the above-noted resonant electron discharge.

It is an object of the present invention to provide an improved welding device providing a resonant electron discharge between adjacent surfaces of parts to be joined for heating same.

It is another object of the present invention to provide an improved method and means for maximizing the heating by an electron discharge between adjacent surfaces of two parts to be joined to most efficiently raise the temperature of these surfaces for welding.

It is still another object of the present invention to provide an improved welding device employing, in a vacuum, electron discharge between parts to be joined.

Further objects and advantages of the present invention will become apparent from the following specification and claims taken together with the appended drawing wherein the sole figure is a sectional view of a preferred embodiment of the invention.

Considering the elements and connections of the invention and referring to the drawing, there is shown an envelope or housing 1 which encloses a vacuum chamber 2 and which is preferably fabricated for disassembly to provide access to chamber 2 for cleaning or the like. Housing 1 may thus be formed of a pair of end portions 3 and 4 and a center portion 6, all having flanges thereabout in contact with each other and being secured together, as by bolts through the flanges, and having gaskets or washers about the connection to insure air-tightness. Housing 1 is evacuated through a pipe 7 which may extend through a wall of center portion 6 and which communicates with a vacuum pump 8 and may have a valve 9 disposed therein to shut off chamber 2 from pump 8.

End portions 3 and 4 are each provided with an aperture in the end wall thereof and these apertures are aligned about a common axis which extends through the center of chamber 2. Within these apertures there are disposed means carrying the parts to be welded and these means are removably positioned within the apertures in order that they may be removed to attach or detach parts to be joined if such is desired. One of the mounting means may be formed to rigidly hold a part 11 to be joined and may, as shown, consist of a conical plug 12 having a small bore therethrough and mating with an aperture tapered inwardly in end portion 3. Plug 12 may be made of rubber or the like to form a good seal with the edges of the aperture in end portion 3 and also to grasp or clamp part 11 which extends through the bore in plug 12 in mating relation thereto.

The mounting means engaging end portion 4 may be formed as a hollow cylinder 13 having its external surface formed to slip-fit the walls of the aperture in end portion 4 and to thus be movable therein along the axis of the aperture upon the application of sufficient force to overcome the friction of the slip-fit. Within hollow cylinder 13 there is provided gripping and sealing means, such as a deformable cylinder 14, engaging the internal bore of hollow cylinder 13 and having a second part 16 to be joined extending therethrough along the axis of the aperture in end portion 4 and disposed in contiguous relation to part 11, i. e., adjacent and out of contact therewith. The mounting means carrying part 16 is thus movable along the common axis of parts 11 and 16 and maintains a substantially vacuum-tight seal about part 16 and about the aperture in end portion 4.

There may be further provided means engaging either part 11 or 16 or both to move same into contact and so positioned as to be accessible from the exterior of housing 1. There is shown a simple lever arrangement 17 mounted upon end portion 4 and extending to contact the end of part 16 in pivotal relation to housing 1; however, it will be appreciated that various means are suitable for this purpose including an axially-aligned spring-actuated release mechanism, for example.

Considering now the electrical elements and connections of the invention, it will be seen from the drawing that there is provided a high frequency power supply or voltage source 18 which has a variable output frequency controlled by a knob 19. One of the output terminals of the high frequency (or H. F.) voltage source is connected through a switch or circuit breaker 21 to one of the parts 11, while the other output terminal is connected to one terminal of a rheostat or potentiometer 22. Connection is also made from the other rheostat terminal to a contact 23 disposed adjacent part 16 and adapted to electrically contact same. In order that the circuit may be automatically broken before shorting through parts 11 and 16 when they come in contact with each other, electrical contact 23 may be immovably mounted in sliding electrical contact with part 16 whereby the end of part 16 passes contact 23 and breaks contact therewith immediately prior to joining of parts 11 and 16. It should be noted in this respect that similar results may be obtained by employing an overload circuit breaker in the high frequency line which opens when the current in the circuit increases beyond a predetermined value. A further electrical element provided is a coil or air core solenoid 24 disposed intermediate parts 11 and 16 and aligned about the common axis thereof with the air core connecting parts 11 and 16. Solenoid 24 is energized from a direct current (or D. C.) power supply 26 disposed exterior to housing 1 and connected across solenoid 24 through lead-through insulators in the housing wall.

With reference to the operation of invention, there is first inserted in plug 12 and cylinder 13 the parts 11 and 16 to be welded. It will be appreciated that these parts may have any configuration and that the mounting means may be formed to grip or clamp these parts in various ways as by jaws or the like. Also, it is not necessary for parts 11 and 16 to extend through the mounting means as provision may be made for electrical connection to the parts internal to housing 1. The mounting means, which may have been removed from housing 1 for the attachment thereto of parts 11 and 16, are inserted in appropriate apertures in housing 1 with plug 12 mating with the tapered aperture in end portion 3 and cylinder 13 slipping into the aperture in end portion 4. Electrical connection is made from high frequency voltage source 18 to parts 11 and 16 through switch 21 and rheostat 22, and solenoid 24 is energized by D. C. power supply 26. Operation of vacuum pump 8 is then commenced and chamber 2 evacuated.

The vacuum produced in chamber 2 causes a pressure differential between the interior and exterior of housing 1 and this pressure acts upon cylinder 13 to move it inwardly of housing 1 so that parts 11 and 16 approach one another. This movement of cylinder 13 and attached part 16 will be seen to automatically result from the pressure difference produced by the vacuum within housing 1, and with the proper amount of friction in the contact of cylinder 13 with housing 1 this movement is steady and not unduly rapid.

With the constant reduction in spacing between parts 11 and 16 there occurs an electron discharge between parts 11 and 16 by virtue of the high frequency voltage impressed therebetween by voltage source 18. It will be appreciated that this discharge occurs much more readily in the evacuated chamber 2 than it would at atmospheric pressure and also that less energy loss occurs in the vacuum. Also solenoid 24 produces magnetic lines of force through the air core thereof between parts 11 and 16 by virtue of the current flowing therethrough from D. C. power supply 26 and these lines of force focus the electron discharge to strike the opposing part and prevent misdirection and loss of electrons from the discharge. As parts 11 and 16 approach one another they reach a certain separation $d$ wherein the voltage and frequency are such that a resonant interchange of electrons occur between parts 11 and 16. This phenomenon is termed electron multipaction and occurs when the potential V, the separation $d$, and the wavelength of impressed voltage $\lambda$ are in such relation as to satisfy the equation:

$$V = K\left(\frac{d}{\lambda}\right)^2$$

wherein K is a constant for particular geometry and apparatus. Multipaction provides an electron cascade or avalanche by the reversal of the polarity of impressed voltage in the electron transit time between parts serving as electrodes whereby secondary electrons are accelerated from each part in turn to the other part. A tremendous heating effect attends the electron multipactoring and the adjacent surfaces of parts 11 and 16 are heated to incandescence almost instantaneously. It is to be noted that the net current flow through H. F. voltage source 18 remains quite small during multipaction between parts 11 and 16 although a large current transfer is effected back and forth between the parts. The above-noted relation of voltage, distance, and wavelength is that required for the initiation of multipaction and after initiation the phenomenon persists even though one of the values, such as the distance, is changed a small amount and thus there is actually a short period of time during which multipaction occurs even though part 16 is moving. Also the frequency required is quite high and thus a large quantity of electrons discharge between parts 11 and 16 owing to the multitude of polarity reversals during the short time that the parts are separated the proper distance. It will also be appreciated from the above equation that either the voltage or frequency thereof may be varied to produce multipactoring with a set distance between parts 11 and 16 and this is probably best accomplished by fixing cylinder 13 as by a flange about the outer end so that it is immobile.

Following multipaction and consequent heating of adjacent surfaces of parts 11 and 16 these parts are placed in contact either by the continued movement of cylinder 13 under the influence of air pressure or by actuation of such as a lever arrangement 17 forcing part 16 into contact with part 11. Owing to the very high temperature of the adjacent surfaces of parts 11 and 16, contact of these parts fuses them together and joins parts 11 and 16 with practically a perfect weld which is invisible to ordinary inspection. No slag, oxide, or the like is present inasmuch as the entire operation is performed in a vacuum and a very uniform weld is produced without the weak spots resulting from the uneven heating of conventional devices.

Parts 11 and 16 joined together are then removed by forceably sliding the combination from the mounting means and with the insertion of other parts in the mounting means another welding operation may be performed. During the removal, vacuum pump 8 may be turned off or valve 9 closed; however, with a small chamber 2 and large pumping capacity, it is possible to allow pump 8 to continue operation during the time chamber 2 is open as the pressure therein will rapidly drop upon closure of housing 1. It will, of course, be appreciated that the conditions for multipaction are influenced by the pressure within chamber 2 as the electron transit time is a function thereof and thus it is possible to control or produce multipaction by controlling the pressure in chamber 2. This may be accomplished either by adjustment of valve 9 or by control of pump 8.

Inasmuch as mounting means, including parts 12 and 13, are removably mounted in housing, there are unavoidable air leaks into housing 1, particularly about cylinder 13; however, with a large pumping capacity compared to the size of chamber 2 satisfactory vacuum may be easily obtained.

There has been disclosed above an improved electric welding device accomplishing the noted objects and having numerous advantages over conventional apparatus and while the invention has been disclosed with respect to a single preferred embodiment, it will be apparent to those skilled in the art that numerous modifications and variations are possible within the spirit and scope of the invention and thus it is not intended to limit the invention except by the terms of the following claims.

What is claimed is:

1. An improved welding device comprising an evacuated chamber, means for inserting a pair of metallic parts to be welded therein, a source of high frequency voltage connected between said parts, voltage control means connected to said high voltage source for setting the voltage between said parts to produce multipaction, and means forcing said parts into contact after heating thereof by multipaction therebetween.

2. A method of welding metallic parts comprising the steps of disposing a pair of parts to be welded in juxtaposition with surfaces to be joined facing each other, evacuating the space between the surfaces to be joined, producing electron multipaction between said surfaces whereby the temperature thereof is raised, and urging the adjacent surfaces of said metallic parts together to form a butt weld.

3. An improved butt welding device comprising means disposing metallic parts to be welded in juxtaposition with the surfaces thereof to be joined contiguous, an evacuated envelope defining a chamber about said surfaces and enclosing the space therebetween, a source of high frequency voltage connected between said parts to produce electron multipaction therebetween, and means urging said surfaces of said parts to be joined into contact to butt weld same.

4. An improved butt welding device comprising an evacuated chamber adapted to contain in contiguous relationship a pair of metallic parts to be butt welded, a source of high frequency voltage, a variable resistance connected in series with said source of voltage across said parts to be welded whereby the voltage therebetween is variable to produce electron multipaction therebetween, and means engaging one of said parts to move same into contact with the other of said parts to join same.

5. An improved welding device comprising a housing enclosing a chamber, means communicating with said chamber for continuous evacuation thereof, means engaging said housing and disposing a pair of metallic parts to be welded within said chamber with the surfaces thereof to be joined adjacent one another, and a source of high frequency voltage connected between said parts, the voltage frequency of said source being controllable to produce electron multipaction between adjacent surfaces of said parts in said chamber, and one of said parts being movably mounted with respect to the other whereby movement into contact after electron multipaction therebetween perfects a butt welding thereof.

6. An improved device for butt welding a pair of metallic parts comprising a housing having an aperture in one wall thereof, means evacuating said housing, means removably disposing one of said parts with the surface thereof to be joined within said housing, a cylindrical mounting engaging the other of said parts to be welded disposed in the aperture in said housing and slideably engaging said housing whereby said mounting and part are movable under the influence of the vacuum within said housing to approach the part disposed therein, and a source of high frequency voltage connected between said parts to be welded and producing electron multipaction therebetween.

7. An improved welding device for joining a pair of metallic parts and comprising an evacuated housing having apertures in opposite walls thereof, mounting means removably disposed within one of said apertures and carrying one of said parts with the surface thereof to be joined internal to said housing, a cylinder slideably engaging said housing in the other aperture therein and carrying the other part in alignment with said above-mentioned part whereby said cylinder and part are movable into said housing by pressure difference between the inside and outside of said housing, and a source of high frequency voltage connected between said parts whereby electron multipaction occurs therebetween as said parts approach each other and the surfaces thereof heated by multipaction join upon contact.

8. An improved welding device for joining a pair of metallic parts comprising means securing said parts in alignment with the faces thereof to be joined adjacent each other, means evacuating the space between said parts, a source of high frequency voltage connected between said parts to produce electron discharge therebetween, and means engaging at least one of said parts and movable under the influence of the vacuum between said parts to move said parts together whereby said electron discharge multipactors and adjacent faces of said parts are joined upon contact by the high heat thereof resulting from electron multipaction.

9. An improved welding device comprising means disposing a pair of metallic parts in alignment with surfaces thereof to be joined adjacent each other, an evacuated envelope enclosing the surfaces of said parts to be joined and the space therebetween, a variable frequency high frequency voltage source connected between said parts to produce electron multipaction therebetween, and moving means engaging one of said parts to urge said parts into contact whereby same are joined.

10. An improved butt welding device comprising mounting means having a pair of elements each adapted to removably carry a part to be joined, said elements being aligned and being movable relative to each other along a common axis to move said parts into contact, a source of high frequency voltage connected between said parts to produce electron discharge therein whereby the temperature of adjacent surfaces of said parts are heated, an air core solenoid disposed between said parts with the air core thereof aligned with the parts to be welded, and a power source energizing said solenoid to produce a magnetic field through the core thereof directing and focusing electron discharge between said parts.

ROBERT W. CLACK.

No references cited.